United States Patent
Gomes et al.

(10) Patent No.: US 11,167,932 B2
(45) Date of Patent: Nov. 9, 2021

(54) ROLLER ASSEMBLY FOR A CONVEYOR BELT

(71) Applicant: Metso Outotec Finland Oy, Tampere (FI)

(72) Inventors: Rodrigo Alfredo Gomes, Sorocaba (BR); Andrzej Niklewski, São Paolo (BR)

(73) Assignee: Metso Outotec Finland Oy, Tampere (FI)

( * ) Notice: Subject to any disclaimer, the term of this patent is extended or adjusted under 35 U.S.C. 154(b) by 0 days.

(21) Appl. No.: 17/041,684

(22) PCT Filed: Mar. 29, 2019

(86) PCT No.: PCT/BR2019/050114
§ 371 (c)(1),
(2) Date: Sep. 25, 2020

(87) PCT Pub. No.: WO2019/183705
PCT Pub. Date: Oct. 3, 2019

(65) Prior Publication Data
US 2021/0009358 A1     Jan. 14, 2021

(30) Foreign Application Priority Data

Mar. 29, 2018    (BR) .................. BR 10 2018 006507

(51) Int. Cl.
*B65G 39/12*     (2006.01)
*B65G 21/06*     (2006.01)
*B65G 15/08*     (2006.01)

(52) U.S. Cl.
CPC ........... *B65G 39/125* (2013.01); *B65G 21/06* (2013.01); *B65G 15/08* (2013.01)

(58) Field of Classification Search
CPC ...... B65G 39/125; B65G 15/08; B65G 39/14; B65G 39/12; B65G 39/145
(Continued)

(56) References Cited

U.S. PATENT DOCUMENTS 3,049,219 A * 8/1962 Arndt ................... B65G 39/145
                                                    198/827
3,194,387 A * 7/1965 Poundstone ......... B65G 39/145
                                                    198/825
(Continued)

FOREIGN PATENT DOCUMENTS

DE     19628470 A1 *  1/1998   ............. B65G 39/14
EP      3380418 B1 *  4/2020   ............. B65G 39/12
(Continued)

OTHER PUBLICATIONS

International Search Report and Written Opinion for International Application No. PCT/BR2019/050114 dated Jun. 26, 2019.

*Primary Examiner* — Mark A Deuble
(74) *Attorney, Agent, or Firm* — Andrus Intellectual Property Law, LLP (57) ABSTRACT

The assembly of the disclosure includes two inclined side rollers and two central rollers, each one of the rollers being mounted around a respective shaft. The shaft of each side roller has an upper end hinged to a respective support portion arranged on one side of the conveyor belt, the shaft of each central roller having ends mounted on opposite sides of a rocker frame. Each one of the opposite sides of the frame has a median portion hinged, in an suspended way, at the lower end of the shaft of a respective side roller.

6 Claims, 6 Drawing Sheets

(58) Field of Classification Search
USPC .................................. 198/825–830
See application file for complete search history.

(56) References Cited

U.S. PATENT DOCUMENTS

| | | | | |
|---|---|---|---|---|
| 3,219,177 | A * | 11/1965 | Reilly | B65G 39/14 |
| | | | | 198/827 |
| 3,246,736 | A * | 4/1966 | Lo Presti | B65G 39/16 |
| | | | | 198/827 |
| 3,880,275 | A | 4/1975 | Fischer et al. | |
| 4,043,447 | A * | 8/1977 | Donnelly | B65G 15/00 |
| | | | | 198/827 |
| 4,134,488 | A * | 1/1979 | Bigney | B65G 39/12 |
| | | | | 198/827 |
| 4,186,831 | A * | 2/1980 | Mercurio | B65G 39/14 |
| | | | | 198/501 |
| 5,938,005 | A * | 8/1999 | Stokman | B65G 19/08 |
| | | | | 198/827 |
| 6,193,055 | B1 * | 2/2001 | Brink | B65G 39/14 |
| | | | | 198/827 |
| 7,886,892 | B2 * | 2/2011 | Fourney | B65G 47/34 |
| | | | | 198/370.03 |
| 2002/0046928 | A1 * | 4/2002 | Swinderman | B65G 15/08 |
| | | | | 198/827 |
| 2002/0050444 | A1 | 5/2002 | Tapp | |
| 2002/0063042 | A1 * | 5/2002 | Fischer | B65G 39/125 |
| | | | | 198/826 |

FOREIGN PATENT DOCUMENTS

| | | | |
|---|---|---|---|
| JP | 2011255990 A | 12/2011 | |
| SU | 630157 A1 | 10/1978 | |
| SU | 800050 A1 | 1/1981 | |
| WO | WO-2013082642 A1 * | 6/2013 | ........... B65G 39/125 |

* cited by examiner

ROLLER ASSEMBLY FOR A CONVEYOR BELT

CROSS-REFERENCE TO RELATED APPLICATIONS

This application is the U.S. national stage application of International Application PCT/BR2019/050114, filed Mar. 29, 2019, which international application was published on Oct. 3, 2019, as International Publication WO 2019/183705 A1 in the English language. The International Application claims priority of Brazilian Patent Application No. BR 10 2018 006507 6 filed Mar. 29, 2018.

FIELD OF THE INVENTION

The present invention relates to a construction applied to a roller assembly mounted on each one of the supports of a conveyor belt of bulk material for providing spaced rotating supports along the length of the conveyor belt by a determined distance to optimize the number of roller and support assemblies without causing an undue increase of the power required to move the belt as a result of internal frictions of the bulk material, deformation of the belt in contact with the rollers of each support and also frictions to rotate each roller.

BACKGROUND OF THE INVENTION

Figure 1:
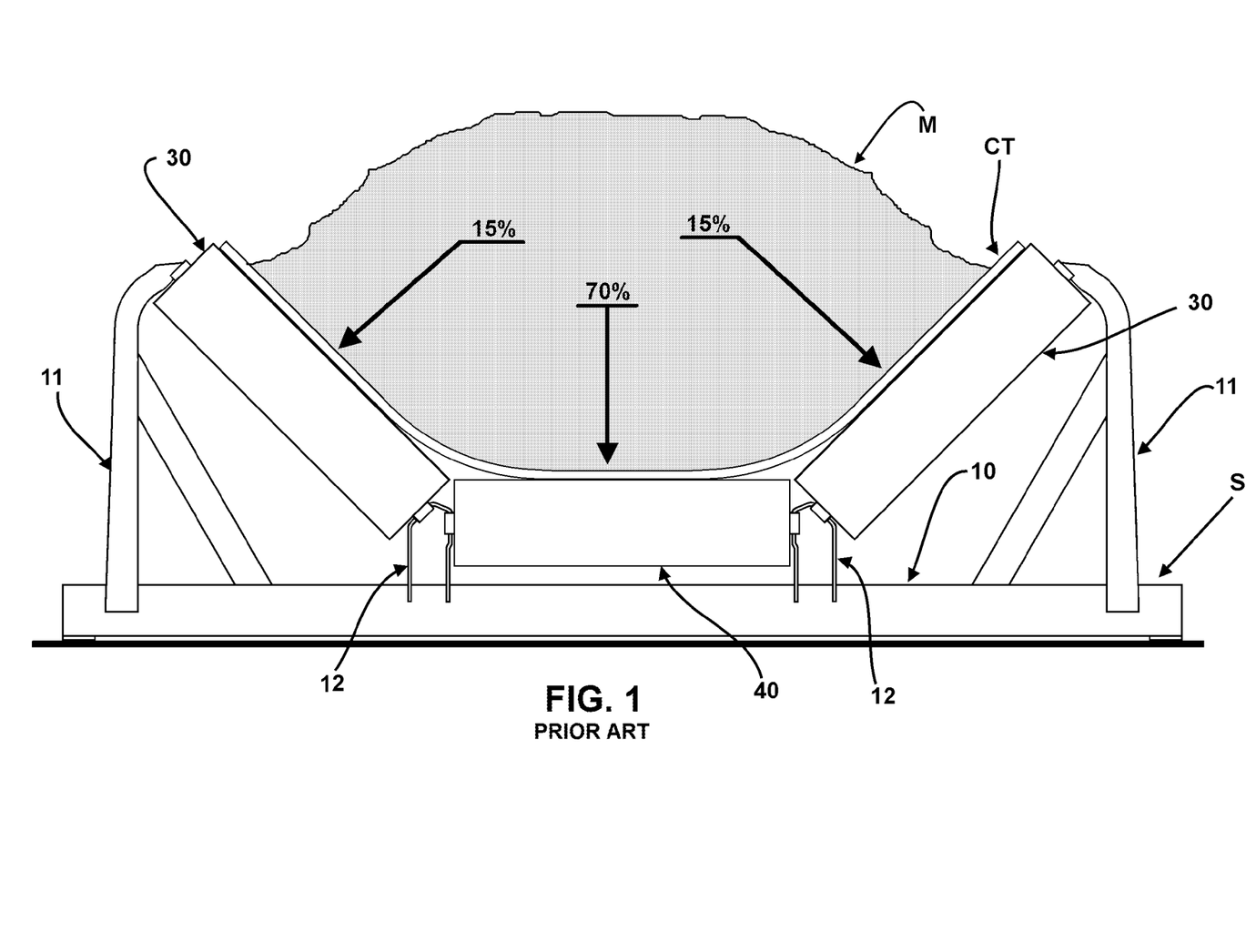
FIG. 1 illustrates a cross-sectional view of a conveyor belt with a load of bulk material, and a roller assembly mounted on a support, according to a prior art construction.

The roller assemblies of the type shown in FIG. 1 of the accompanying drawings are well known in the art and which are each one mounted on a support which comprises a basic frame 10, provided transversely to the conveyor belt CT and incorporating, superiorly, two higher end columns 11, and two lower median columns 12. Between each end column 11 and each confronting median column 12 a respective side roller 30 is rotationally and inclined mounted, and wherein between the two median columns 12 it is rotationally mounted at least one central roller 40. Said construction can be observed in several documents such as, for example, in FIGS. 1 and 2 of the patent application US 2002/0050444 A1.

FIG. 1 of the accompanying drawings further illustrates a typical load distribution on the roller assembly of a support S of a conveyor belt CT, wherein from about 15% of the total load is applied to each of the side rollers 30, while from about 70% of the total load is applied to the central roller 40.

It is well known to those skilled in the art that the power required for the driving in linear displacement of a conveyor belt can be quite high, even when said conveyor belt is arranged in a horizontal path.

Figure 1A:
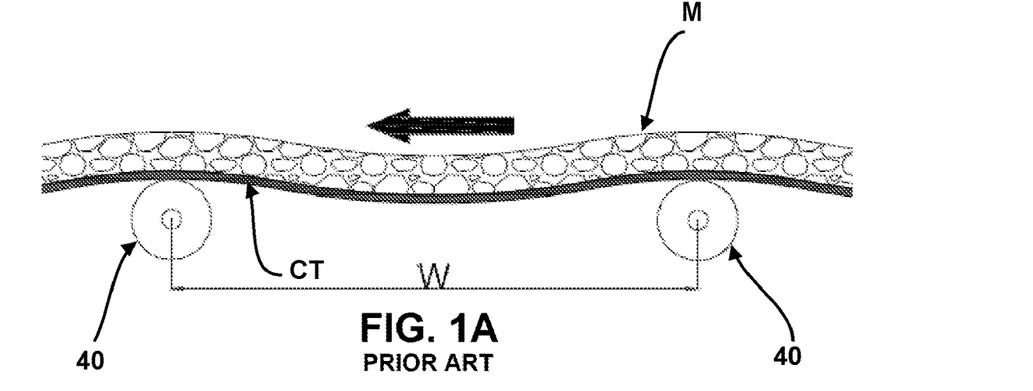
FIG. 1A schematically illustrates the free span between two roller assemblies of the type shown in FIG. 1 and also the undulating movement of the conveyor belt as a function of the free span between the central rollers of the two consecutive assemblies.

FIG. 1A of the accompanying drawings illustrates, in a schematic way, the distance W between each two central rollers 40 of two consecutive supports S, and the undulating movement of the conveyor belt CT as a result of the free span between said central rollers 40. The undulating movement of the belt increases the internal friction of the bulk material M being conveyed, being this a first factor in the determination of the required power to move the belt.

Figure 1B:
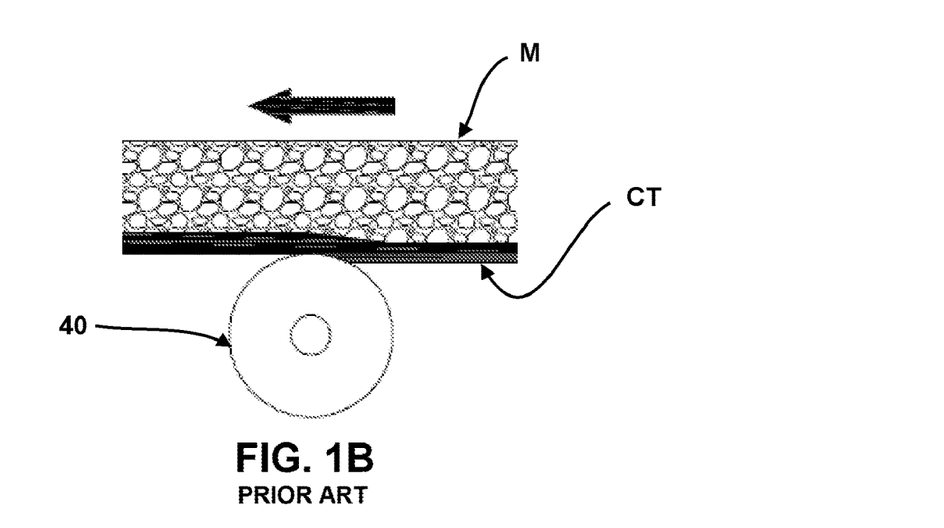
FIG. 1B schematically illustrates the elastic deformation of the conveyor belt when, in movement with a load of bulk material, contacts the central roller of a roller assembly.

A second factor for defining the required power to move the conveyor belt CT is the deformation of the latter when, in moving under load, contacts a roller, particularly the central roller 40, as illustrated in FIG. 1B of the accompanying drawings. This effect does not vary in a linear way, but rather in an exponential way with the increase of the load of bulk material M on the conveyor belt CT.

A third factor for determining the power required for the movement of the conveyor belt CT is defined by the friction for rotating a roller. This friction is proportional to the load on the belt and also to the diameter of the roller bearing and of the shaft of the roller. The larger the roller shaft diameter, the greater will be the friction. Since the diameter of the shaft and of the roller bearings is defined as a function of the load applied on them, the reduction of said load allows the use of rollers with shafts and roller bearings of smaller diameter and, therefore, with less rotation friction.

Figure 2:
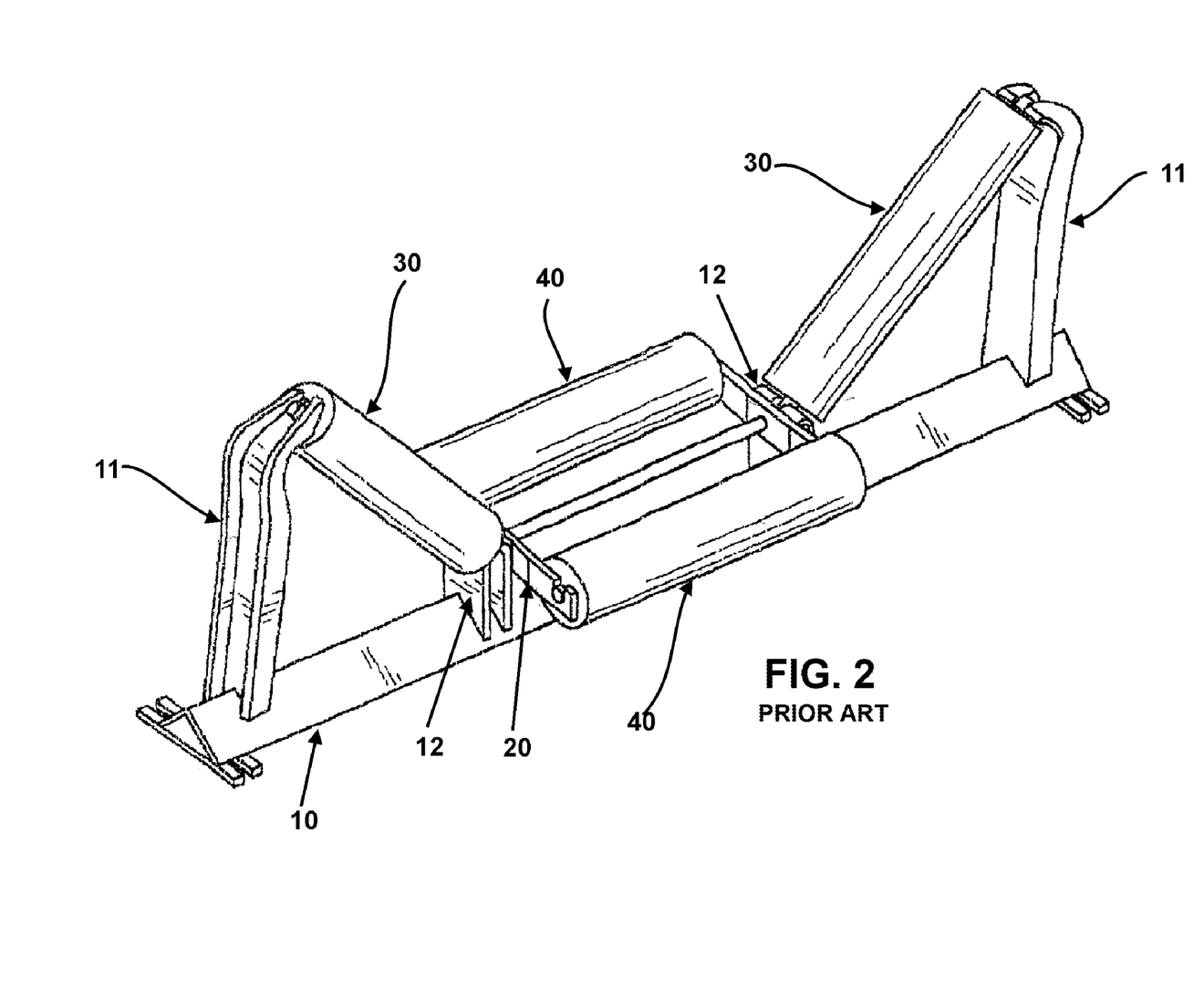
FIG. 2 illustrates a perspective view of another prior art construction, in which a support carries not only the inclined side rollers but also a rocker frame in which two central rollers are mounted.

A well-known solution for reducing the factors of the increase of the required power is that one shown in FIG. 2 of the accompanying drawings and also in FIGS. 3 to 6 and 9 to 11 of document US 2002/0050444 A1, whereby the two median columns 12 of the basic frame 10 support, in a pivoting way, the median and opposite ends of a frame 20, rocker mounted, and in which are rotatably mounted two central rollers 40, which are parallel and spaced apart.

In this second known constructive arrangement, the two side rollers 30 and the frame 20, which carries the two central rollers 40, are rotatably mounted on rigid supports which are defined by the end columns 11 and the median columns 12, allowing the reduction of the factors related to the required power to move the conveyor belt CT.

The use of the two central rollers 40 allows for a substantial reduction of the distance W between the confronting center rollers of each two consecutive assemblies by decreasing the undulating movement of the conveyor belt CT and, thus, the friction power losses between the particles of the bulk material being conveyed.

The mounting of the two central rollers 40 in the frame 20 enables to reduce by half the contact pressure between the conveyor belt CT and the leading central roller on each support S, by reducing, in a more than proportional way, the resistance produced by the contact of the belt against the leading central roller 40.

In addition, the duplicity of central rollers 40 enables a substantial reduction of the load of the bulk material M on said central rollers and, consequently, the diameter of the shaft and of the roller bearings, by reducing the rolling resistance of the rollers.

Figure 3:
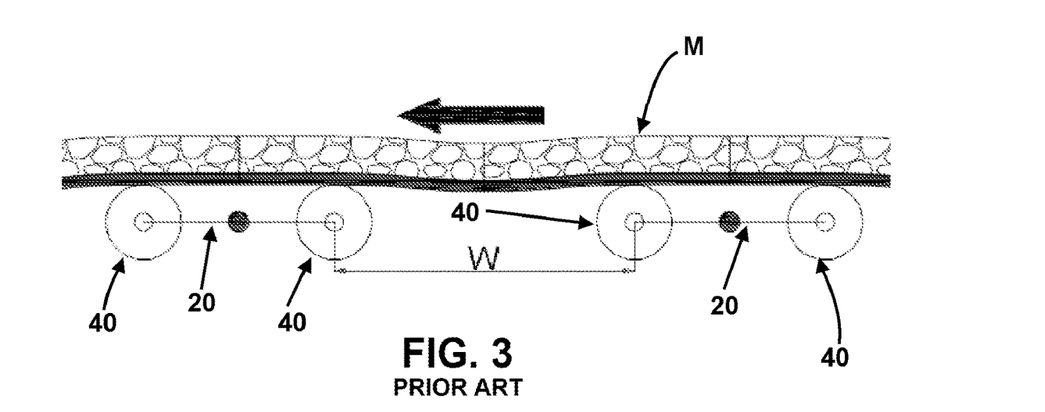
FIG. 3 schematically shows the smaller free span between two roller assemblies of the type shown in FIG. 2 and also the consequent lower undulating movement of the conveyor belt.

The positive effects of this second mounting arrangement, with two central rollers 40 in the rocker frame 20, are schematically illustrated in FIG. 3 of the accompanying drawings, and it can be said that this known constructive arrangement enables, when applied to long horizontal conveyor belts, a reduction of about 25% to 35% in the required power to move the belt, by causing not only a significant decrease in the energy consumption to move the belt, but also a considerable simplification and reduction of cost in the driving system, including reducers, pulleys and other components.

Despite the aforementioned advantages related to the roller assemblies on each support S, comprising two side rollers 30 and two central roller 40, in a rocker arrangement, said known construction requires dimensional accuracy in the construction and mounting of the support S and requires the stop of the conveyor belt CT for the replacement of one or more side rollers 30 or central rollers of each assembly in the respective support S, which constitutes in a very relevant negative aspect in long systems for handling bulk material.

SUMMARY OF THE INVENTION

Due to the drawbacks of the known roller assemblies for a conveyor belt, with regard to the dimensional and mounting accuracy of the supports and also the difficulty of maintaining the rollers with the belt in operation, the present invention aims to provide a roller assembly defined by two inclined side rollers and two central rollers and which can be easily assembled and disassembled from a respective structural support with the conveyor belt in operative movement under load, without requiring dimensional accuracy in the construction and mounting of the support and providing the advantages of reducing the factors which define the power required for moving the belt.

According to the invention, the roller assembly is arranged transversely to the displacement direction of the conveyor belt and comprises two inclined side rollers and two central rollers, horizontal and parallel to each other, each of the side and central rollers being mounted rotatably free around a respective shaft, the shaft of each side roller having an upper end which is hinged to a respective support portion arranged on one side of the conveyor belt, and a lower end, wherein the shaft of each central roller has opposite ends mounted on opposite sides of a rocker frame, each of the opposite sides of the frame having its median portion hinged at the lower end of the shaft of a respective side roller.

With the above construction, the roller assembly object of the present invention has the two central rollers mounted on a rocker frame, which is held horizontally suspended by its median hinge at the lower ends of the shafts of the two inclined side rollers, the upper end of the shaft of each of the side rollers being hinged to a respective support portion on a respective side of the conveyor belt.

In the present solution, the side rollers and the rocker frame, carrying the two central rollers, are arranged as a "chain" suspended between the two support portions, requiring substantially less dimensional and mounting accuracy than that which is required for the solutions in which the side rollers and the central rollers have the ends of their shafts directly mounted on a support arranged transversely to the belt.

In addition to the above advantage, the present solution enables the suspended roller assembly to be easily replaced, being then sufficient that the upper end of the shaft of each side roller is disengaged from its hinge to the respective support portion, even with the conveyor belt in movement.

BRIEF DESCRIPTION OF THE DRAWINGS

The invention will be described below with reference to the accompanying drawings, given by way of example of possible embodiments for the roller assembly in question and in which.

DESCRIPTION OF THE INVENTION

As shown in the drawing figures and already mentioned above, the invention relates to a roller assembly arranged transversely to the displacement direction of a conveyor belt CT and comprising two inclined side rollers 30 and two central rollers 40, horizontal and parallel to each other, each of the side rollers 30 and central rollers 40 being mounted, rotatably free, around a side shaft 31 and central shaft 41, respectively.

According to the invention, the shaft 31 of each side roller 30 has an upper end 31a hinged to a respective support portion PS, arranged on one side of the conveyor belt CT, and a lower end 31b, which is held suspended, as described hereinafter, without being supported in the support S.

Figure 4:
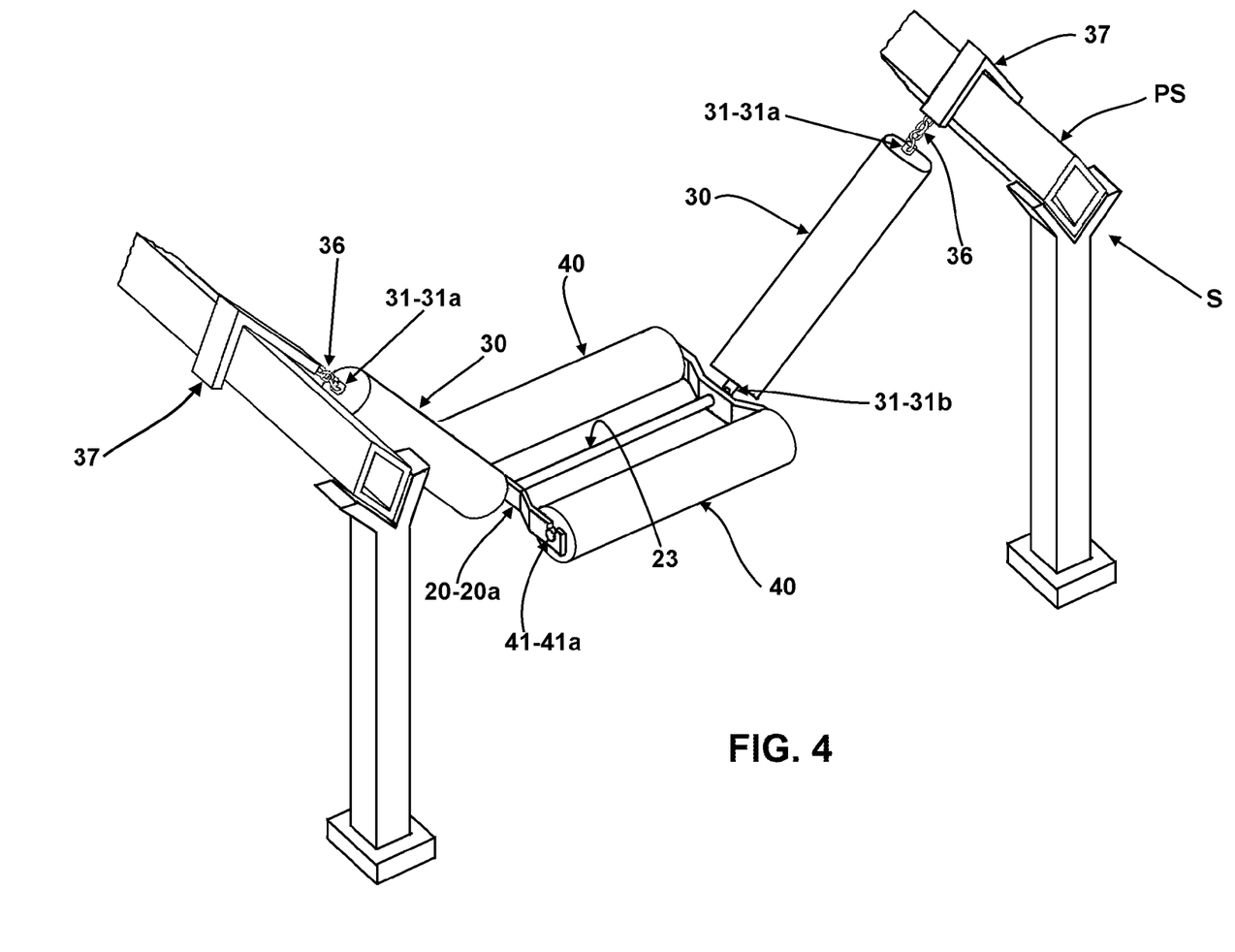
FIG. 4 illustrates a perspective view of the roller assembly of the present invention in which two inclined side rollers have the upper end of their shafts hinged to a respective support portion and the lower end of their shafts hinging, in a suspension way, opposite sides of a rocker frame, in which two central rollers are mounted.

As shown in FIG. 4, the support S can be constructed in different ways provided that it has two high support portions PS, for example in the form of horizontal rails, raised and parallel in relation to the conveyor belt CT.

The shaft 41 of each central roller 40 has opposite ends 41a and mounted on opposite sides 20a of a rocker frame 20, said opposite sides of the frame 20 being parallel to each other and to the linear displacement direction of the conveyor belt CT. Each one of the opposite sides 20a of the frame 20 has a median portion hinged, in a suspension way, in the lower end 31b of the shaft 31 of a respective side roller 30. Thus, the roller assembly remains suspended only by the hinge of the upper ends 31a of the shafts 31 of the side rollers 30 in respective support portions PS.

The frame 20 can be constructed in different manners, wherein the drawings illustrate only some of the possible embodiments, according to which each side of the frame 20 comprises a crossbar 21 having end portions 21a, opposite to each other and in each one is mounted one of the ends 41a of the shaft 41 of one of the central rollers 40.

In the illustrated exemplificative constructions, the end portions 21a of the crossbars 21 are each provided with an upper recess 21b in each one is engaged and retained one end 41a of the shaft 41 of one of the central rollers 40. This arrangement enables quick and simple assembly and disassembly operations of the central rollers 40 relative to the frame 20.

Figure 5:
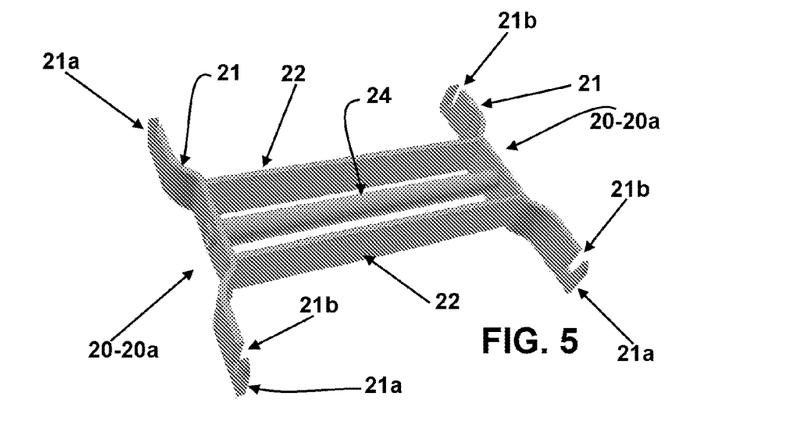
FIG. 5 shows a perspective view of the rocker frame shown in FIG. 4.
Figure 5A:
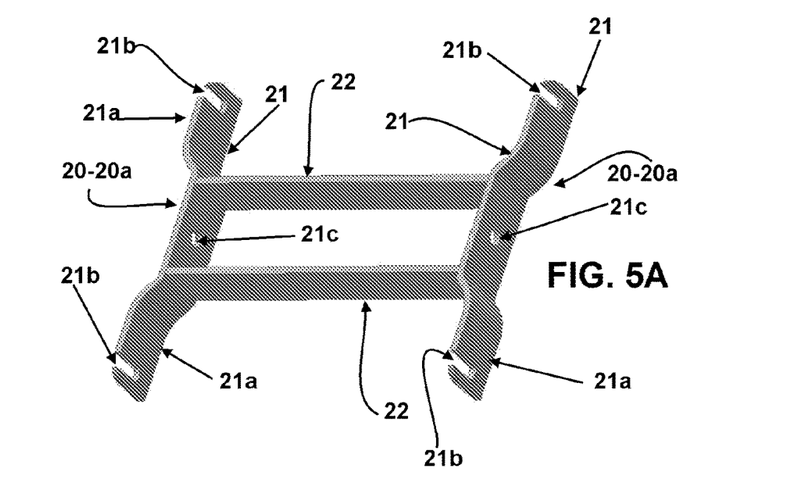
FIGS. 5A and 5B illustrate perspective views of two further possible exemplary embodiments for the rocker frame.

In FIG. 5A is shown a frame 20 in which the crossbars 21 are joined to each other by two struts 22, internal to the central rollers 40 and transversal to the displacement direction of the conveyor belt CT. Each crossbar 21 has its median portion provided with a through hole 21c in which one end 23a of a frame shaft 23 is arranged, said end 23a of the frame shaft 23 being hinged to the lower end 31b of the shaft 31 of one of the side rollers 30.

A variant constructive of the construction of frame 20 is illustrated in FIG. 5. In this embodiment, the frame further comprises a central tubular strut 24 arranged between the two struts 22, joining the crossbars 21 and having their ends opened through the through holes 21c provided in the adjacent crossbars 21, the frame shaft 23 being housed within the central tubular strut 24.

Figure 5B:
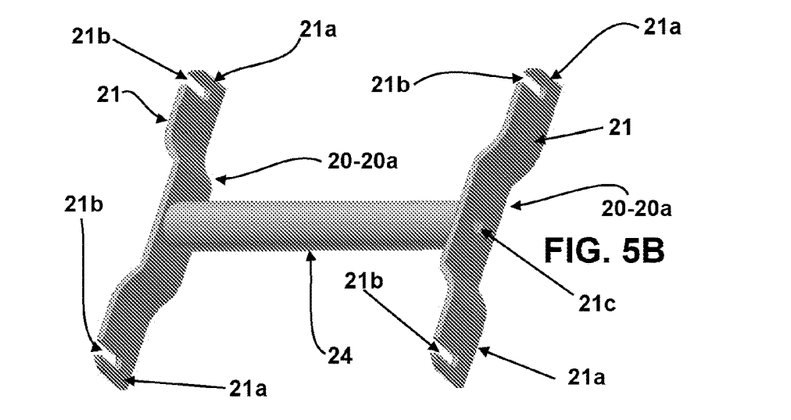

In another embodiment for the frame 20, shown in FIG. 5B, the crossbars 21 of the rocker frame 20 are joined to each other by a central tubular strut 24, having ends which are open through the respective through holes 21c, provided in the adjacent crossbars 21. Also in this case, the central tubular strut houses the frame shaft 23 which has its ends 23a arranged through the through holes 21c of the crossbars 21 and hinged to the lower end 31b of the shaft 31 of a respective side roller 30.

The hinge between the lower end 31b of the shaft 31 of each side roller 30 and the adjacent end 23a of the frame shaft 23 can be obtained by different ways such as, for example, by pivoting the confronting ends of said two shafts, at opposite ends of a short hinge arm 35.

Figure 6:
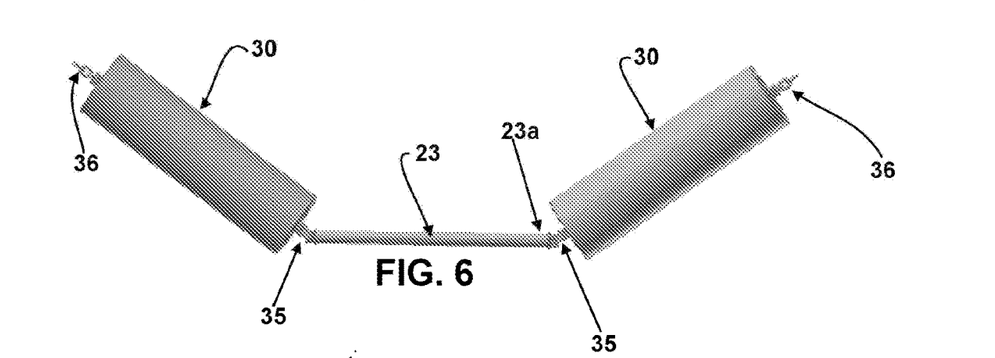
FIG. 6 illustrates the relative positioning of the shafts of the rollers of the assembly and a possible construction for the hinged interconnection between the lower ends of the shafts of the side rollers and the opposite ends of a bearing central shaft of the rocker frame.
Figure 6A:
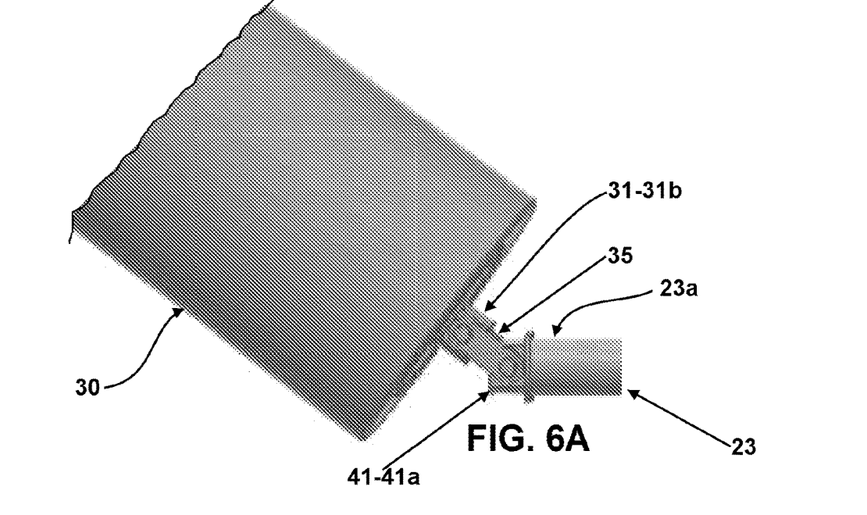
FIG. 6A represents an enlarged detail of FIG. 6, showing the hinged interconnection between the lower end of the shaft of a side roller and an adjacent end of the central shaft of the rocker frame.
Figure 6B:
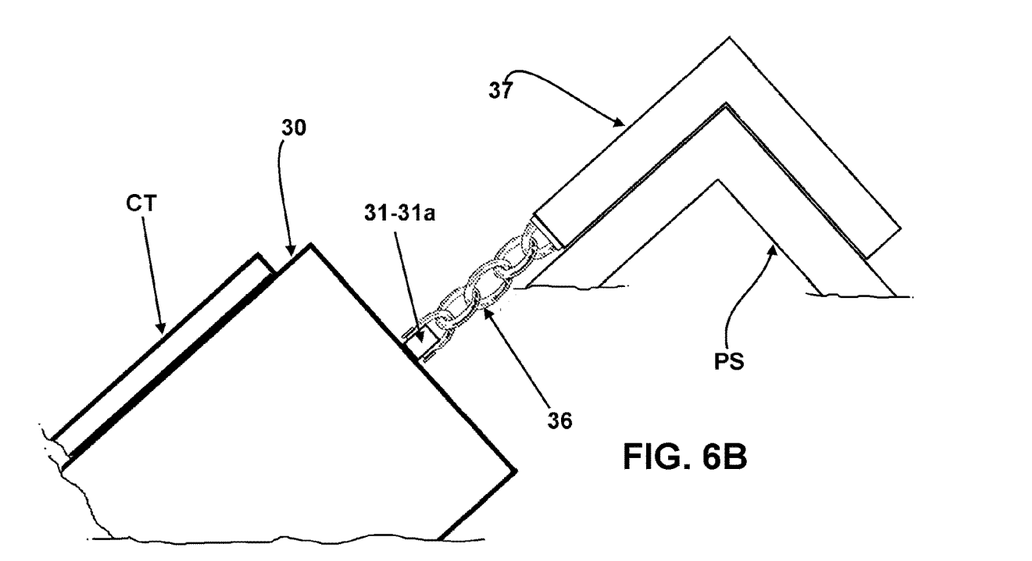
FIG. 6B represents an expanded detail of FIG. 6, showing the element of the hinged interconnection between the upper end of the shaft of a side roller and a respective support portion.

In a similar manner, the hinge between the upper end 31a of the shaft 31 of each side roller 30 and the respective support portion PS can be made in different ways, as that one illustrated in FIGS. 4, 6 and 6A, according to which a suspension stay 36, for example a chain with one end coupled to the shaft 31 and with the opposite end in the form of a hook 37 to be engaged in the respective support portion PS.

Although only a few embodiments have been illustrated for the roller assembly in question, it should be understood that several amendments can be made in the shape and in the physical layout of the component parts of the roller assembly without departing from the inventive concept defined in the claim set which accompanies this disclosure.

The invention claimed is:

1. A roller assembly for a conveyor belt, arranged transversely to a displacement direction of the conveyor belt and comprising:
    two side rollers each inclined outwardly and upwardly relative to the conveyor belt;
    two central rollers positioned horizontal and parallel to each other, each one of the side rollers and each one of the central rollers being mounted rotatably free around a respective shaft; and
    a rocker frame having a pair of opposite crossbars that are parallel to each other and to the displacement direction of the conveyor belt, wherein each of the crossbars has end portions opposite each other, wherein the crossbars of the rocker frame are connected to each other by a pair of struts positioned transverse to the displacement direction of the conveyor belt, each crossbar having a median portion including a through hole that receives one end of a frame shaft that extends between the pair of crossbars,
    wherein the shaft of each side roller has an upper end hinged to a respective support portion arranged on one side of the conveyor belt and a lower end hinged to one end of the frame shaft,
    wherein the shaft of each central roller has ends which are opposite to each other and are mounted on each of the pair of opposite crossbars of the rocker frame.

2. The roller assembly, according to claim 1, wherein the end portions of the crossbars are each provided with an upper recess in each one is engaged and retained one end of the shaft of one of the central rollers.

3. The roller assembly, according to claim 1, wherein the frame further comprises a central tubular strut arranged between the pair of struts, joining the crossbars and having their ends open through the through holes provided in the adjacent crossbars, wherein the frame shaft is housed within the central tubular strut.

4. The roller assembly, according to claim 1, wherein the crossbars of the rocker frame are joined to each other by a central tubular strut having ends open through the respective through holes provided in the adjacent crossbars, wherein said central tubular strut houses the frame shaft.

5. The roller assembly, according to claim 1, wherein the hinge between the lower end of the shaft of each side roller and the adjacent end of the frame shaft is obtained by their pivoting at the opposite ends of a hinge arm.

6. The roller assembly, according to claim 1, wherein the hinge between the upper end of the shaft of each side roller and the respective support portion is obtained by a suspension stay with one end coupled to the shaft and with the opposite end in the form of a hook to be engaged in the respective support portion.

* * * * *